UNITED STATES PATENT OFFICE.

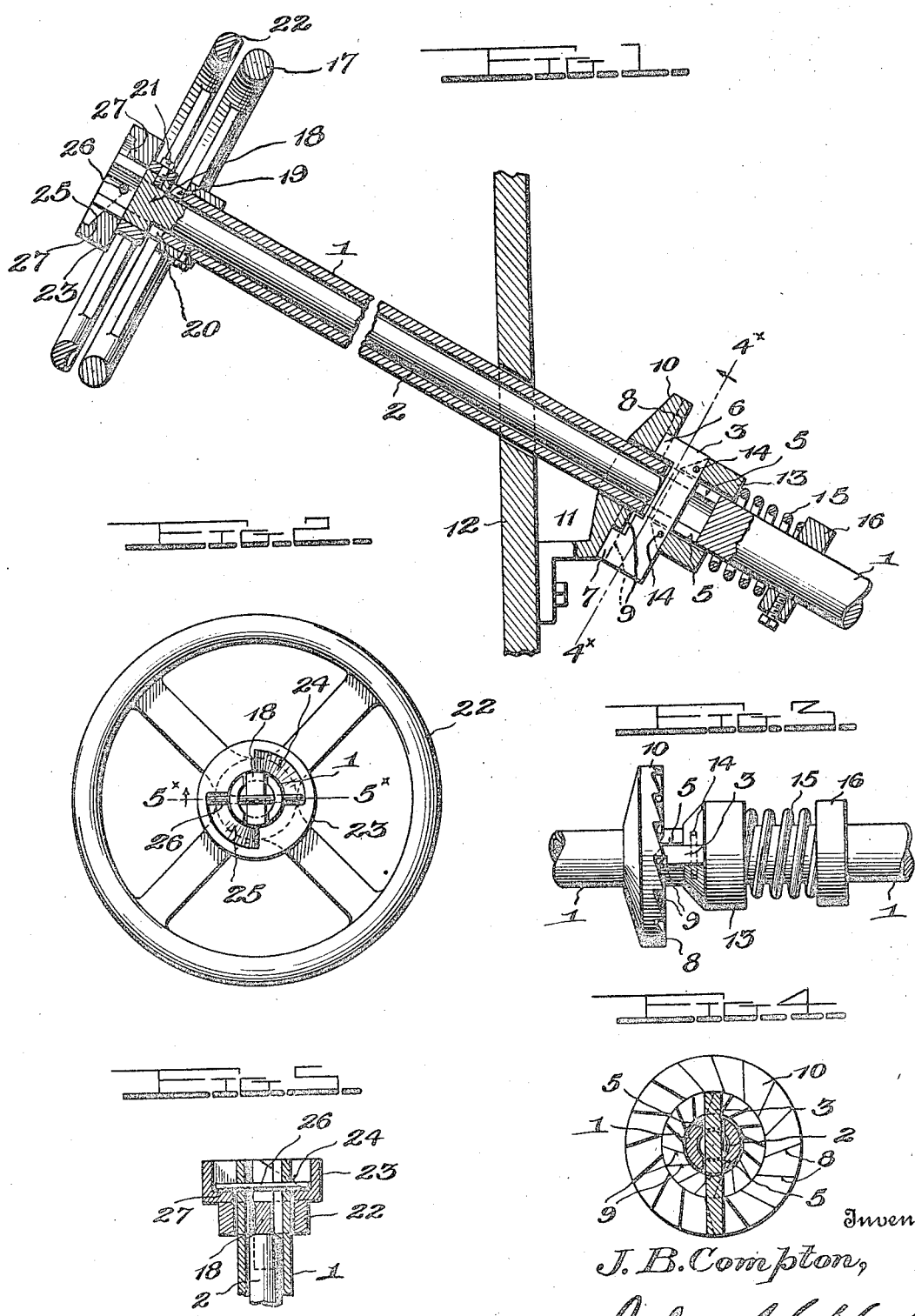

JOSEPH B. COMPTON, OF BUCHANAN, KENTUCKY, ASSIGNOR OF ONE-HALF TO F. T. D. WALLACE, JR., OF LOUISA, KENTUCKY.

STEERING MECHANISM FOR MOTOR-VEHICLES.

1,217,155.      Specification of Letters Patent.      Patented Feb. 27, 1917.

Application filed April 27, 1916. Serial No. 94,026.

*To all whom it may concern:*

Be it known that I, JOSEPH B. COMPTON, a citizen of the United States, residing at Buchanan, in the county of Lawrence and State of Kentucky, have invented certain new and useful Improvements in Steering Mechanism for Motor-Vehicles, of which the following is a specification.

The primary object of this invention is the provision of improved mechanism for retaining the steering gear in motor cars in fixed positions, thereby preventing the machine from veering from a directed course when striking road obstructions, and relieving the driver of the strain of constantly trying to guide the car.

In order to more fully describe my invention, reference will be had to the accompanying drawings wherein, Figure 1 represents in vertical central section partly in elevation one embodiment of my said invention;

Fig. 2, a plan view looking down upon the auxiliary steering wheel;

Fig. 3, a fragmentary top plan of the locking ratchet and pawl and adjacent parts;

Fig. 4, a detail section on line $4^x$—$4^x$ Fig. 1, and

Fig. 5, a detail section on line $5^x$—$5^x$ Fig. 1.

In the accompanying drawings, 1 represents the main steering post which is connected in the usual manner to the steering gears. As these gears form no part of my present invention and their connection with the steering post is well understood in this art, they will not be here shown nor further described.

Steering post 1 is hollow for a greater portion of its length, and there is inserted in its bore from the outer end of the post a rod or shaft 2 fitting said bore in such way as to turn therein axially and also to move longitudinally thereof. The lower end of this rod engages with one edge of a block 3 which extends transversely through the steering post 1, which for that purpose is provided with slots 5, 5 in its opposite walls. On this block 3 are formed two pawl teeth 6 and 7 which lie on opposite sides of post 1, and these teeth are adapted to engage respectively with two concentric rows of teeth 8 and 9 on a ratchet 10 formed on a bracket 11 rigidly attached to any convenient fixed portion 12 of the car, which may be a portion of the dash board.

The block 3 and its teeth constitute a pawl, and will hereinafter be referred to as such. The back of this pawl rests in a slot in a collar 13 to which it may be made fast by friction or by pins 14, or in any other desired way. This collar is adapted to slide longitudinally of post 1 which it encircles, and is at all times under the pressure of a coil spring 15 inserted between said collar and another collar 16 fast on post 1 in such manner as to constantly tend to force the teeth of pawl 3 into engagement with ratchet 10.

Steering post 1 is turned angularly on its longitudinal axis to steer the car, by steering wheel 17 fast thereto near its upper end. The end of rod 2 adjacent this steering wheel has a flattened head 18 extending into slots 19 and 20 in opposite walls of post 1, and fastened by screw 21 or otherwise to an auxiliary steering wheel 22.

Adapted to rest against the outer face of the hub of auxiliary wheel 22 is a collar 23 adapted to turn on the outside of post 1 and having on its outer face cam surfaces 24 and 25 adapted to engage with a pin 26 fast to and extending transversely of post 1 adjacent its upper end. The collar 23 and pin 26 constitute a lock the function of which will later appear.

As long as pawl 3 is in engagement with the teeth of ratchet 10, as shown in Fig. 1, it will be seen that steering post 1 will be locked in a certain position against rotation on its longitudinal axis. When it is desired to operate post 1 to change the direction of the car, auxiliary wheel 22 is pressed toward wheel 17 thus forcing rod 2 downward and pawl 3 away from fixed ratchet 10 against the compression of spring 15. This frees steering post 1 so that as long as pawl 3 is thus disengaged from its ratchet, the car may be steered in any direction.

If it is desired to lock pawl 3 out of engagment with its ratchet, this may be effected by rotating collar 23 in such direction as to cause pin 26 to pass over the inclined or cam surfaces 24 and 25 thereof onto the flat face 27, which operation forces rod 2 down and holds it in that position. This relieves the driver of the necessity of continuously pressing wheel 22 toward wheel 17.

It will be observed that with the steering post 1, locked as described, the car will not veer when striking uneven places or obstacles in the road. This locking of the steering gear also relieves the driver of the constant strain of keeping the car directed in a certain course.

Without limiting my invention to the specific embodiment thereof herein shown, what I claim is:—

1. Steering mechanism for motor vehicles, comprising a tubular steering post rotatable on its longitudinal axis and provided with a transverse opening passing through it, a steering wheel fast to said post, a fixed ratchet, a pawl adapted to engage with said ratchet, said pawl extending through said opening in said post and adapted to move longitudinally thereof, a spring exerting a pressure on said pawl tending to force it into engagement with said ratchet to lock said post against rotation, a rod extending into said post and movable longitudinally thereof to force said pawl out of engagement with said ratchet, and an auxiliary steering wheel fast to said rod.

2. Steering mechanism for motor vehicles, comprising a tubular steering post rotatable on its longitudinal axis and provided with a transverse opening passing through it, a fixed ratchet, a pawl adapted to engage with said ratchet teeth, said pawl extending through said opening in said post and adapted to move longitudinally thereof, a spring exerting a pressure on said pawl tending to force it into engagement with said ratchet to lock said post against rotation, a rod extending into said post and movable longitudinally thereof to force said pawl out of engagement with said ratchet, means fast to said rod for manipulating the same, and a lock operable on said rod to lock said pawl out of engagement with said ratchet.

3. Steering mechanism for motor vehicles, comprising a tubular steering post rotatable on its longitudinal axis, a rod inserted therein and adapted to move longitudinally thereof, and means movable longitudinally of the steering post and under the control of said rod for locking said steering post against rotation on its longitudinal axis.

4. Steering mechanism for motor vehicles, comprising a tubular steering post rotatable on its longitudinal axis, a steering wheel fast to said post, a rod inserted therein and adapted to move longitudinally thereof, means movable longitudinally of the steering post and under the control of said rod for locking said steering post against rotation on its longitudinal axis, and an auxiliary steering wheel on said rod.

5. Steering mechanism for motor vehicles, comprising a tubular steering post rotatable on its longitudinal axis, a stationary locking member, a locking member connected to said post movable longitudinally thereof and adapted to engage the said stationary member to lock said post against rotation, and a rod inserted in said post and movable longitudinally thereof to disengage said movable locking member from said fixed locking member.

6. Steering mechanism for motor vehicles, comprising a tubular steering post rotatable on its longitudinal axis and provided with a transverse opening passing through it, a steering wheel fast to said post, a fixed ratchet having two rows of oppositely disposed teeth, a pawl having teeth adapted to engage respectively with the said two rows of ratchet teeth, said pawl extending through said opening in said post and adapted to move longitudinally thereof, a spring exerting a pressure on said pawl tending to force it into engagement with said ratchet to lock said post against rotation, a rod extending into said post and movable longitudinally thereof to force said pawl out of engagement with said ratchet, an auxiliary steering wheel fast to said rod, and a rotary cam lock operable through said rod to lock said pawl out of engagement with said ratchet.

In testimony whereof I affix my signature in the presence of two witnesses.

JOSEPH B. COMPTON.

Witnesses:
F. T. DEBALLNE, JR.,
JESSIE EDMON.